Patented June 3, 1941

2,244,412

UNITED STATES PATENT OFFICE 2,244,412

FILTRATION

Charles T. Anné, Laurance V. Phillips, and William Schwarz, Port Arthur, Tex., assignors to The Texas Company, New York, N. Y., a corporation of Delaware No Drawing. Application June 10, 1939, Serial No. 278,484

5 Claims. (Cl. 210—62)

This invention relates to dewaxing hydrocarbon oil and particularly to dewaxing by a method involving filtration.

Broadly, the invention contemplates removing wax from a mixture of wax-bearing oil and a solvent by filtration in the presence of a small amount of an alkaline material, such as ammonia, sufficient to inhibit rotting and deterioration of the fabric forming the filter surface through which the filtrate is passed and upon which the filter cake of wax is deposited. The invention has to do particularly with filters in which a textile fabric, such as cotton cloth, is employed as the filter medium.

In the usual commercial dewaxing operations the textile filter fabric may undergo deterioration. This may be due in part to the wear and tear experienced in service. It may be due also to the action of certain constituents present in the wax-bearing mixture being filtered.

It has been discovered that if the wax-bearing mixture contains a small amount of an alkali, such as ammonia, the rate of deterioration of the filter cloth is very greatly reduced.

In carrying out the invention wax-bearing lubricating oil stock, for example, is mixed in the usual way with a dewaxing solvent, such as a mixture of methyl ethyl ketone and commercial benzol. Other selective solvents, or solvent mixtures, may be used. If desired, the solvent may comprise low-boiling petroleum hydrocarbons, such as propane, butane, pentane, naphtha, etc.

The wax-bearing oil is usually mixed with the solvent in the proportion of around one part of wax-bearing oil to about three or four parts by volume of the dewaxing solvent. The resulting mixture is chilled to a temperature which may range from around 0 to —20° F. and lower, and sufficient to precipitate the wax as solid hydrocarbons.

A small amount of liquid ammonia, or ammonium hydroxide, is incorporated in the mixture; for example, a concentrated ammonium hydroxide solution (5 normal) may be used. The proportion of alkali used may be around 0.008 to 0.01 pound of anhydrous ammonia per barrel of oil. The amount of alkali used may be regulated so that the dewaxed oil-solvent mixture and the slack wax-solvent mixture are slightly alkaline.

The chilled mixture containing the alkali is then passed to a filter advantageously of the continuous rotary type and wherein the solidified wax hydrocarbons are removed as a filter cake and the resulting filtrate comprising dewaxed oil mixed with solvent.

While ammonia and ammonium hydroxide have been specifically mentioned, it is intended that other hydroxides and members of the alkali group may be used. It is advantageous to use a liquefied normally gaseous alkaline substance, and which, upon injection in the wax-bearing mixture, will readily distribute itself uniformly through the mass. Ammonia has been found particularly suitable, although it is contemplated that other substances, such as members of the amine group of organic compounds, particularly the primary, secondary and tertiary aliphatic amines, may be used.

Since the amount employed is relatively small, it is therefore desirable to employ the material in the liquid form, as, for example, concentrated ammonium hydroxide, and which can be injected by means of a small chemical proportioning pump.

Obviously, many modifications and variations of the invention, as hereinbefore set forth, may be made without departing from the spirit and scope thereof, and therefore only such limitations should be imposed as are indicated in the appended claims.

We claim:

1. In the dewaxing of wax-bearing lubricating oil wherein the oil is mixed with a dewaxing solvent, chilled, and the chilled mixture filtered to remove the wax, the filter surface comprising a textile fabric, the method of materially increasing the service life of said filter fabric, which comprises incorporating in the mixture of wax-bearing oil and dewaxing solvent liquid prior to filtration a small amount of alkaline neutralizing agent and effecting filtration in the presence of said substance.

2. In the dewaxing of wax-bearing lubricating oil wherein the oil is mixed with a dewaxing solvent, chilled, and the chilled mixture filtered to remove the wax, the filter surface comprising a textile fabric, the method of materially increasing the service life of said filter fabric, which comprises injecting in the mixture of wax-bearing oil and dewaxing solvent liquid prior to filtration a small amount of a substance comprising a liquefied normally gaseous alkaline neutralizing agent selected from the group consisting of ammonia and primary, secondary and tertiary aliphatic amines and effecting filtration in the presence of said substance.

3. In the dewaxing of wax-bearing lubricating oil wherein the oil is mixed with a dewaxing solvent, chilled, and the chilled mixture filtered to remove the wax, the filter surface comprising a textile fabric, the method of materially increasing the service life of said filter fabric, which comprises incorporating in the mixture of wax-bearing oil and dewaxing solvent liquid prior to filtration a small amount of ammonium hydroxide and effecting filtration in the presence of said substance.

4. In the dewaxing of wax-bearing lubricating oil by filtration with a filter having a textile filter fabric, the steps comprising mixing the wax-bearing oil with a dewaxing solvent, chilling the mixture, incorporating in the chilled mixture a small amount of ammonia of the order of 0.008 to 0.01 pound of anhydrous ammonia per barrel of the oil, sufficient to inhibit deterioration of the fabric by constituents of the oil, and filtering the chilled mixture containing said small amount of ammonia to produce a filter cake of wax and a filtrate comprising dewaxed oil.

5. In the dewaxing of wax-bearing lubricating oil wherein the oil is mixed with a dewaxing solvent liquid, chilled, and the chilled mixture filtered to remove the wax, the filter surface comprising a textile fabric, the method of materially increasing the service life of said filter fabric, which comprises incorporating in the mixture of wax-bearing oil and dewaxing solvent liquid, prior to filtration, a small amount of a hydroxide selected from the hydroxide of the alkali group elements, and effecting filtration in the presence of said hydroxide.

CHARLES T. ANNÉ.
LAURANCE V. PHILLIPS.
WILLIAM SCHWARZ.